Feb. 26, 1946.            R. WOOL            2,395,705
SHAFT SEAL
Filed March 21, 1944
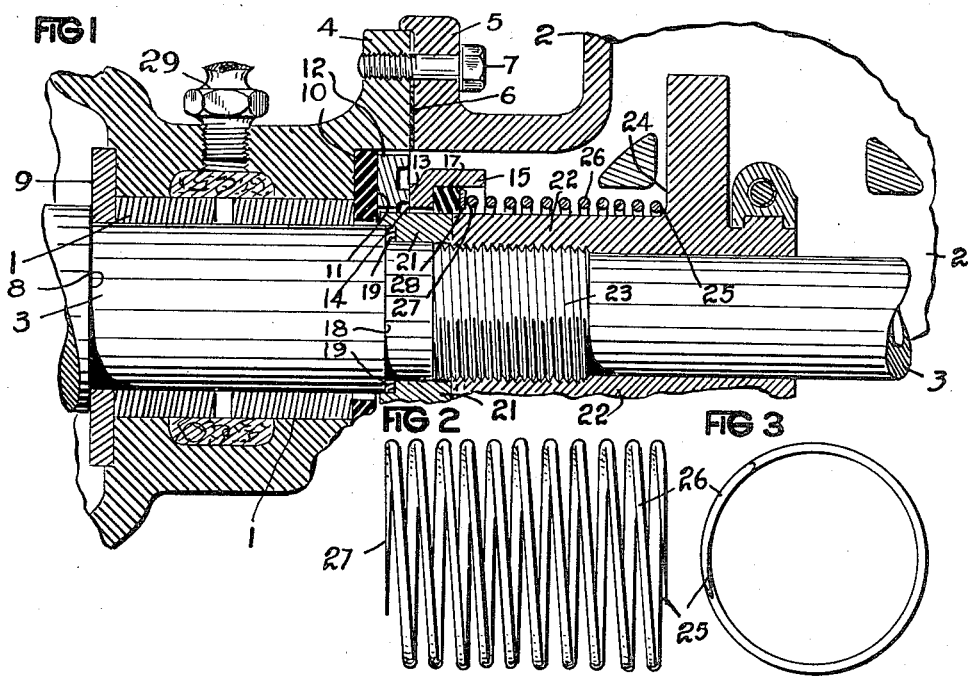
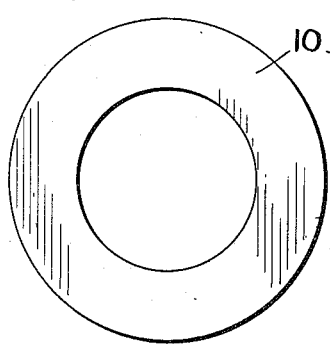
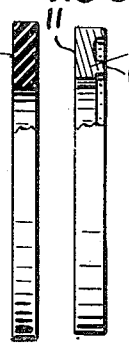
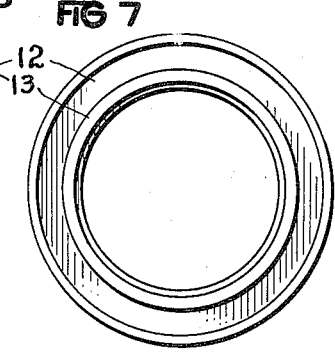
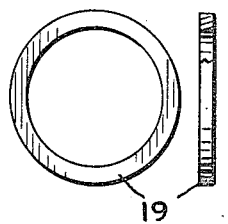
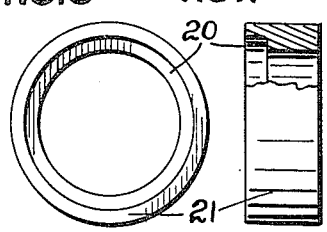
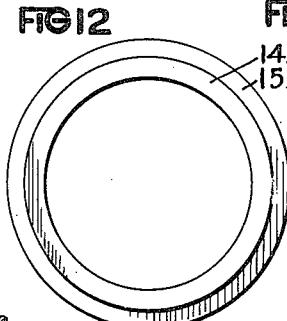
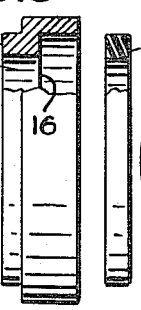
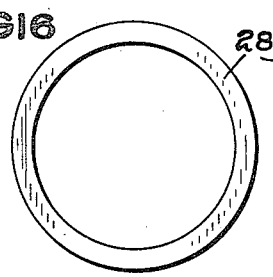
INVENTOR.
RUBIN WOOL.
BY Paul A. Talbot.
ATTORNEY.

Patented Feb. 26, 1946

2,395,705

UNITED STATES PATENT OFFICE 2,395,705

SHAFT SEAL

Rubin Wool, New York, N. Y.

Application March 21, 1944, Serial No. 527,389

7 Claims. (Cl. 286—7)

My invention relates to seals to prevent the leakage of gasses and refrigerants around spindles and shafts, particularly to shafts of electrically driven refrigerators and compressors and for similar purposes. Among the purposes and objects of my invention are to provide:

A combination of relatively resilient and non resilient rings to prevent leakage around shafts.

Rings of neoprene or similar material in which one ring prevents radial leakage and the other axial leakage.

Spring pressed floating bearing rings sealed from leakage by rings of neoprene or the like.

A pair of bearing rings having a polished surface between the fixed ring of the pair and the revolving ring of the pair and a resilient seal for each of the rings.

An improvement in shaft seals.

A shaft seal preventing leakage around vibrating shafts.

A seal to prevent leakage through the bearing between a compressor and the motor which drives it.

A leakproof, convenient, durable shaft seal.

I accomplish these and other objects by the construction herein described and shown in the drawing forming a part of this disclosure in which the following is a brief description of the several views of the drawing.

Fig. 1 is a fragmentary longitudinal section showing the application of my device.

Figs. 2 to 17 are elevations of the principal parts; the end elevations being broken away to show the cross sections.

Figs. 2 and 3 are elevations of the spring.

Figs. 4 and 5 are elevations of the resilient radial seal.

Figs. 6 and 7 are elevations of the stationary bearing ring.

Figs. 8 and 9 are elevations of the shoulder packing.

Figs. 10 and 11 are elevations of the shoulder sleeve.

Figs. 12 and 13 are elevations of the rotary bearing ring.

Figs. 14 and 15 are elevations of the resilient axial seal.

Figs. 16 and 17 are elevations of the spring seat.

Similar reference characters refer to similar parts throughout the several views of the drawing and in the specifications.

General description

Shaft seals of the general type of my seal are well known to the makers of household refrigerators and to the service men who keep them in safe operating condition. It is this experience which has particularly urged me to develop an improvement which is capable of operation over a long period without attention or replacement.

The principal problem is that of shaft vibration at relatively high speeds and temperatures. The bearing ring which is highly polished must be permitted to freely float in resilient support and while so doing, no leakage of gas can be permitted through the bearing or the support.

A very small leakage is not only wasteful but dangerous so that the machine must require attention at once. My seal has shown its merit in service of even old machines over a long period of time. This is accomplished by the use of two resilient rings of neoprene or similar material; one of which is relatively stationary and the other of which revolves with the shaft and both contacting and supporting their respective floating bearing rings.

In this disclosure, I have shown a preferred embodiment of the underlying principles of my invention. The precise detailed specifications to follow are intended to illustrate rather than to limit the scope of my invention. I have not disclosed numerous modifications which may be made by those skilled in the art to which this invention pertains after a study of this disclosure.

Specifications

I have shown, referring particularly to Fig. 1 of the drawing, a motor bearing 1 through which gases would leak from the compressor 2 along the shaft 3 through which the motor drives the compressor. The flange 4 of the motor is preferably connected to the flange 5 of the compressor between which the gasket 6 is compressed by the bolts 7 to prevent leakage between the frames or housings of motor and compressor.

The shaft 3 is preferably provided with a shoulder 8 near one end of the bearing 1 and the thrust ring 9 is pressed against the shoulder and the end of the bearing within the motor. At the opposite end of the bearing 1, I have provided a ring or radial seal 10 of resilient material such as neoprene which engages and presses against the end of the bearing and the back face 11 of the stationary seal bearing 12 which does not contact the shaft, bearing, nor housing, but is free to float and is suspended by the resilient seal 10.

The face 13 of the bearing 12 is highly polished and contacts the polished face 14 of the rotary bearing ring 15 which also is suspended free to float and is preferably provided with an internal shoulder 16 which receives the resilient rotary axial seal 17 which may be of neoprene or similar material.

Near the outer end of the bearing 1, the shaft 3 is preferably provided with a shoulder 18 which receives the metal gasket 19 which is pressed against said shoulder 18 and an internal shoulder 20 in the shoulder sleeve 21 which engages the end of the collar or hub 22 which is threaded to engage the threads 23 on the shaft 3 and jam and press the gasket 19 between the shoulders 18 and 20 to prevent leakage along the shaft.

The hub 22 is preferably flanged or otherwise provided with the face 24 against which one end 25 of the spring 26 is seated. The other end 27 of the spring 26 is seated on and presses against the ring seat 28 which in turn presses against and exerts pressure from the spring to the resilient seal 17 and the rotary bearing ring 15.

The spring thus provides contact pressure to all of the parts along the shaft between the shoulder 8 and face 24 except the shoulder sleeve 21 which is pressed against the gasket and shoulder 18 of the shaft by the hub 22. The pressure applied by the spring prevents the shaft from floating axially and provides the desired pressure for the several parts of the seal.

Attention is called to the resilient floating support provided for the seal bearings 12 and 15 by the two resilient seals 10 and 17 which absorb shaft vibration and substantially eliminate this vibration and the consequent misalignment from affecting the polished bearing faces of the bearings 12 and 15, thus preventing leakage radially by and between these bearing faces, yet permitting lubrication from the bearing 1 to also lubricate these faces.

Lubrication is provided by the oil or grease cup or other means 29.

The hub 22 is shown as having a counterbalance and eccentric (shown fragmentary in Fig. 1) for the compressor, which, however, forms no part of my invention, as the face 24, which serves as a seat for one end of the spring, may be any suitable collar or flange.

Having thus disclosed an embodiment of my invention, what I claim is new and desire to secure by Letters Patent is set forth in the claims which follow.

I claim:

1. In a shaft seal having a pair of bearing rings, one of which is substantially stationary and the other rotatable, a resilient seal supporting said substantially stationary bearing ring, a second resilient seal supporting said rotatable bearing ring, a shoulder sleeve and gasket and a shoulder on said shaft abutting said gasket, a hub collar abutting and pressing said shoulder sleeve against said gasket and pressing said gasket against the shoulder on said shaft, said second resilient seal surrounding both said hub collar and said shoulder sleeve at the abutment thereof, thereby to prevent leakage around and between both said hub collar and said shoulder sleeve.

2. In a shaft seal having a bearing ring and a resilient seal supporting said bearing ring, a shoulder on said shaft, a gasket pressed against said shoulder, a hub collar, a shoulder sleeve abutting said hub collar, said gasket being forced by said collar against said shoulder on said shaft, said seal ring surrounding and pressing against both said shoulder ring and said hub collar to prevent leakage between and around said shoulder ring and said hub collar.

3. In a shaft seal having a bearing ring and a resilient seal supporting said bearing ring, a shoulder on said shaft, a gasket pressed against said shoulder, a hub collar and shoulder sleeve abutting said hub collar, said gasket being forced by said collar against said shoulder on said shaft, said seal ring snugly surrounding both said shoulder ring and said collar to prevent leakage between and around said shoulder ring and said hub collar, and threads on said shaft and threads in said hub collar to force said shoulder sleeve and said gasket against said shoulder.

4. In a shaft seal having a bearing ring and a resilient seal supporting said bearing ring, a shoulder on said shaft, a gasket pressed against said shoulder, a hub collar, a shoulder sleeve abutting said hub collar, said gasket being forced by said collar against said shoulder on said shaft, said seal ring snugly surrounding both said shoulder sleeve and said collar to prevent leakage between and around said shoulder sleeve and said hub collar, and means on said shaft forcing said hub collar against said shoulder sleeve.

5. In a shaft seal for shafts having a shoulder and threads and a bearing ring and resilient seal therein supporting said bearing ring, a hub collar and a spring around said hub collar pressing said seal ring against said bearing ring, a shoulder sleeve within said bearing ring, said hub collar being threaded to engage said threads on said shaft and a gasket forced against said shoulder by said threads and said hub collar and shoulder sleeve.

6. In a shaft seal for shafts having a shoulder and threads, a bearing ring, a resilient seal therein supporting said bearing ring, a hub collar and a spring around said hub collar pressing said seal ring against said bearing ring, said hub collar being threaded to engage said threads on said shaft, a shoulder sleeve and a gasket forced against said shoulder by said threads, said shoulder sleeve and by said hub collar, said shoulder sleeve being disposed between said hub collar and said gasket within said bearing ring.

7. In a shaft seal for shafts having a shoulder and threads, a bearing ring, a resilient seal ring therein supporting said bearing ring, a hub collar and a spring around said hub collar pressing said seal ring against said bearing ring, said hub collar being threaded to engage said threads on said shaft, a shoulder sleeve and a gasket forced against said shoulder by said threads, said shoulder sleeve and said hub collar, a stationary radial seal and radial bearing in contact with said bearing ring, said shoulder sleeve being disposed within said stationary radial seal and radial bearing and within said bearing ring and said seal ring.

RUBIN WOOL.